June 20, 1967 L. E. WHITAKER 3,326,563

STAIR CLIMBING WHEEL UNIT ASSEMBLY

Filed April 30, 1965

United States Patent Office 3,326,563
Patented June 20, 1967

3,326,563
STAIR CLIMBING WHEEL UNIT ASSEMBLY
Leonard E. Whitaker, 1964 Riverway,
Dallas, Tex. 75217
Filed Apr. 30, 1965, Ser. No. 452,209
3 Claims. (Cl. 280—5.26)

This invention relates generally to hand propelled vehicles, such as hand trucks, freight dollies and the like, and more particularly to such vehicles that may be required to ascend or descend stairs with a load.

This invention is an improvement over prior devices designed for stair climbing operations.

A principal object of this invention is to provide a wheel unit assembly that has a minimum number of parts and yet performs as effectively as prior art devices having a greater plurality of parts.

Another important object of this invention is to provide a wheel unit assembly that is made of economical but extremely sturdy parts so that it has a virtual maintenance-free life.

A further object is to provide a wheel unit assembly that is comprised of at least three wheels supported in a housing and wherein the housing is resiliently supported from a central vehicle supporting axle.

An object of one embodiment of the invention is to provide a resiliently mounted housing supporting at least three non-resiliently mounted wheels.

An object of another embodiment is to provide a resiliently mounted housing supporting at least three resiliently mounted wheels.

An additional object is to provide a resiliently mounted housing for a stair climbing wheel unit assembly in which the resilient member is a cylindrical bushing press-fitted into an axle opening of the housing.

And yet another object is to provide a resiliently mounted housing in which a rubber cylindrical bushing is used between the housing and its shaft.

A further object is to provide a resiliently mounted housing in which a "neoprene" rubber bushing and a metal sleeve are used between the housing and its shaft.

A still further object is to provide a resilient mounting between a wheel unit assembly and its axle which will permit the wheel unit assembly to move both in any direction in a vertical plane and to rotate in a universal manner relative to its axle.

And yet another object is to provide a resiliently mounted wheel unit assembly which can accommodate a plurality of wheel sizes with no change in the resilient mounting means.

These and other objects and advantages will be apparent from an examination of the following specification and drawings, in which.

Figure 1:
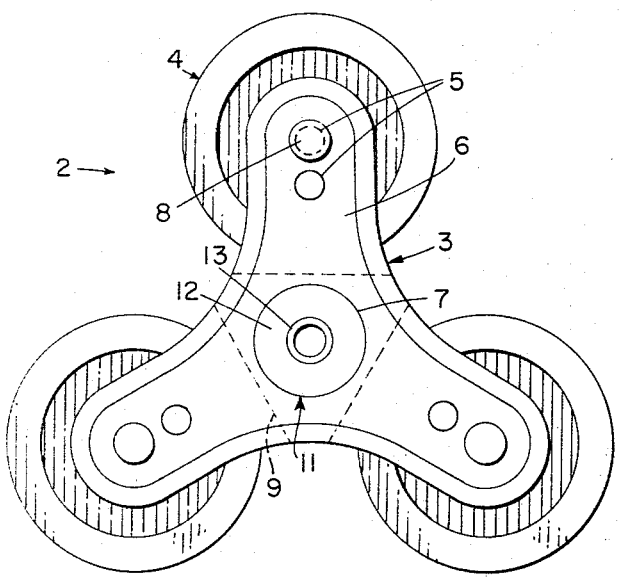
FIGURE 1 is a side elevational view of one embodiment of the wheel unit assembly of this invention.

Referring now more particularly to the characters of reference on the drawing, it will be observed that the wheel unit assembly of FIGURE 1 identified by reference numeral 2, consists basically of a multi-arm wheel unit housing 3 having attached thereto a plurality of radially located wheels 4. The housing 3 includes a plurality of wheel shaft openings 5 located in each of its radially extending arms 6, and includes an enlarged centrally located axle opening 7.

The wheels 4 are made of any suitable material including hard or flexible rubber, molded plastic, metal, or the like, and include a centrally located bearing (not shown) to permit them to rotate freely on their wheel shaft 8. By providing free movement of the wheels 4 on their shafts, it is not necessary to provide either rotation or rigid stability between the shafts and the housing, and this leads to economy of construction.

The housing 3 may be fabricated from metal parts or it may be preferably made by casting aluminum or magnesium or alloys of either metal and other metals. When cast by precision molding techniques that are well known in the art the housing will be ready for assembly with other parts with a minimum of clean up. The finished wheel unit housing 3 includes at least three rigid and radially extending bifurcated arms 6 having sufficient width to accomodate the widest wheel to be used. Each arm and each fork 6a and 6b of each arm 6 includes a plurality of openings 5 to permit relocation of shaft 8 as required to accommodate different diameter wheels 4. The range of diameters of wheels used and the relative location of openings 5 are such that the innermost point of the periphery of wheel 4 maintains a close but clear spacing from the central hub 9, and the outermost point of the periphery is beyond the tip of arm 6.

The central opening 7 of hub 9 is filled with a resilient axle unit 11 which comprises a flexible material cylindrical bushing 12 and a rigid sleeve 13 which is adapted to closely surround the axle of a hand truck or similar vehicle in free turning relation therewith. The resilient axle unit 11 may be inserted and retained in the housing 3 in a variety of ways. The flexible bushing 12 may be pressure fitted both to the housing and to its inner sleeve, or the units may be glued in place, or the resilient unit 11 may be molded in place. The function of resilient unit 11 is to provide not only a means to absorb the predominately vertical shock loads imposed on the wheels due to normal travel and climbing functions but also to provide a "universal" connection between the wheel units and the vehicle axle to absorb excess loading imposed from any direction to relieve strains and jars to any of the operating parts.

Figure 2:
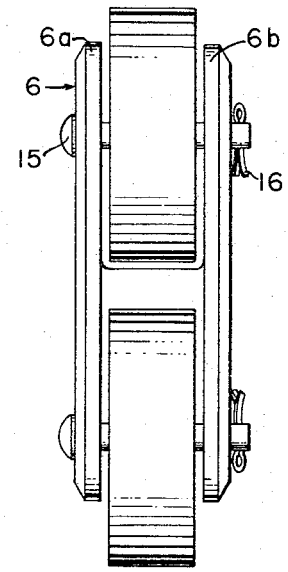
FIGURE 2 is an end view of the device of FIGURE 1.
Figure 3:
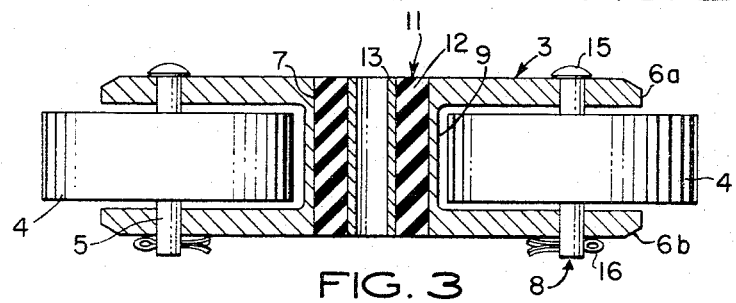
FIGURE 3 is a cross-sectional view of the device of FIGURES 1 and 2.

Since the shock absorbing function of the wheel unit of FIGURES 1–3 is all embodied in the centrally located resilient unit 11, it is possible to install the wheel shafts 8 through aligned openings in arms 6a and 6b without any additional parts and with a relaxed manufacturing tolerance. The shaft 8 is in the form of an elongated rod or bolt having an enlarged head 15 at one end and a cotter pin hole to accommodate cotter pin 16 at the other end.

Figure 4:
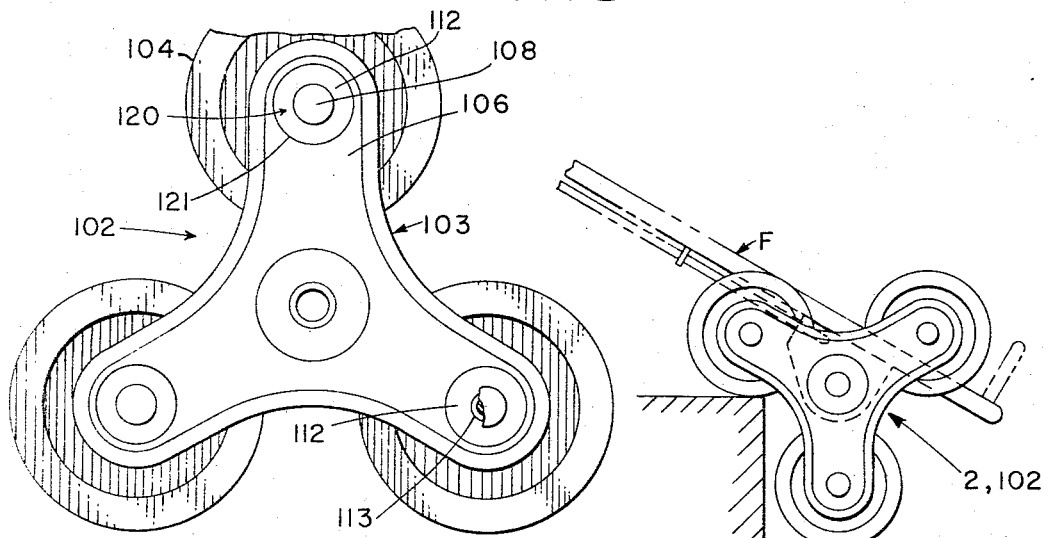
FIGURE 4 is a side elevational view of another embodiment of the wheel unit of this invention.

In the embodiment 102 shown in FIGURE 4, each of the wheel shafts 108 are supported from the wheel unit housing 103 by means of individual resilient units 120 installed in enlarged openings 121 in each radial arm 106. Resilient unit 120 includes a flexible material bushing 112 and a rigid sleeve 113 in a manner similar to that shown in FIGURE 3 for the resilient unit 11.

Figure 5:
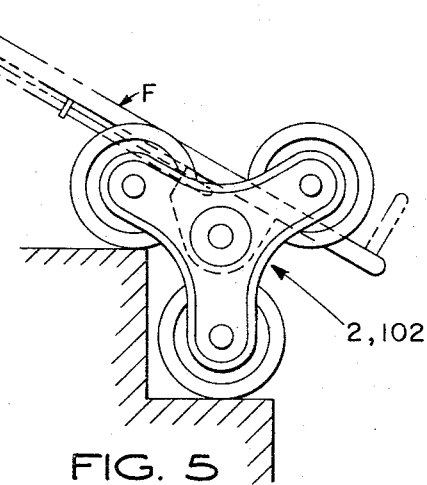
FIGURE 5 is an outline elevational view of the wheel unit assembly of this invention attached to a hand truck and illustrating one operation of the device of this invention.

When either the embodiment of FIGURE 1 or FIGURE 4 is installed on a hand truck dolly as shown in FIGURE 5 it will function to absorb shocks and relieve strains normally imposed on the vehicle frame indicated at F. The embodiment 102 of FIGURE 4 will be preferred for certain applications, but will be more expensive to construct and hence more costly to the user.

Either embodiment provides an improvement over the prior art device of the applicant's earlier Patent Number 3,058,754, granted Oct. 16, 1962.

From the foregoing description it will be readily seen that there has been produced a device which substantially

What is claimed is.

1. A wheel unit assembly for a vehicle having an axle, comprising: a wheel unit housing, a plurality of wheels supported by said housing, a resilient unit between said housing and the axle of said vehicle for providing universal relative motion and absorbing shocks between said housing and said vehicle, said resilient unit including a cylindrical flexible and resilient bushing and a rigid sleeve.

2. A wheel unit assembly for a vehicle having an axle, comprising: a wheel unit housing, a plurality of wheels supported by said housing, a resilient unit between said housing and the axle of said vehicle for providing universal relative motion and absorbing shocks between said housing and said vehicle, said resilient unit including a cylindrical rubber bushing and a metal sleeve.

3. A wheel unit assembly for a vehicle having an axle, comprising: a wheel unit housing, wheel shafts supported by said housing, rotatably mounted on said shafts, means in said housing to selectively space said wheels radially from said axle, and a resilient unit between said housing and the axle of said vehicle and a plurality of additional resilient units between said housing and said wheel shafts.

References Cited

UNITED STATES PATENTS

| 2,650,818 | 9/1953 | Martin | 280—104.5 |
| 2,933,323 | 4/1960 | Webber | 280—5.26 X |
| 3,058,754 | 10/1962 | Whitaker | 280—5.26 |

FOREIGN PATENTS 650,856  10/1928  France.

LEO FRIAGLIA, *Primary Examiner.*